United States Patent [19]

Rawlings

[11] Patent Number: 5,339,890
[45] Date of Patent: Aug. 23, 1994

[54] GROUND SOURCE HEAT PUMP SYSTEM COMPRISING MODULAR SUBTERRANEAN HEAT EXCHANGE UNITS WITH CONCENTRIC CONDUITS

[75] Inventor: John P. Rawlings, Oklahoma City, Okla.

[73] Assignee: Climate Master, Inc., Oklahoma City, Okla.

[21] Appl. No.: 159,027

[22] Filed: Nov. 29, 1993

Related U.S. Application Data

[63] Continuation-in-part of Ser. No. 14,988, Feb. 8, 1993.

[51] Int. Cl.$^5$ .................................................. F24J 3/06
[52] U.S. Cl. ..................................... 165/45; 165/46; 165/142; 62/260; 62/238.7
[58] Field of Search ............... 165/45, 46, 142; 62/260, 238.7

[56] References Cited

U.S. PATENT DOCUMENTS

| | | | |
|---|---|---|---|
| 1,908,733 | 5/1933 | Creel . | |
| 1,951,420 | 3/1934 | Jones . | |
| 2,513,373 | 7/1950 | Sporn et al. | 165/45 |
| 2,611,584 | 9/1952 | Labus . | |
| 3,656,547 | 4/1972 | Beach . | |
| 4,036,286 | 7/1977 | Anderson et al. . | |
| 4,036,294 | 7/1977 | Ecker . | |
| 4,257,239 | 3/1981 | Partin et al. . | |
| 4,286,651 | 9/1981 | Steiger et al. . | |
| 4,325,228 | 4/1982 | Wolf | 62/260 |
| 4,360,056 | 11/1982 | O'Connell | 165/45 |
| 4,373,573 | 2/1983 | Madwed . | |
| 4,407,351 | 10/1983 | Backlund . | |
| 4,412,126 | 10/1983 | Brockway . | |
| 4,452,229 | 6/1984 | Powers . | |
| 4,483,318 | 11/1984 | Margen . | |
| 4,512,156 | 4/1985 | Nagase | 60/641.2 |
| 4,538,673 | 9/1985 | Partin et al. | 165/45 |
| 4,556,101 | 12/1985 | Haldeman | 165/45 |
| 4,574,875 | 3/1986 | Rawlings et al. | 165/45 |
| 4,657,074 | 4/1987 | Tomita et al. . | |
| 4,693,300 | 9/1987 | Adachi | 165/1 |
| 4,714,108 | 12/1987 | Barry | 165/45 |
| 4,741,386 | 5/1988 | Rappe | 165/45 |
| 4,753,285 | 6/1988 | Rawlings | 165/45 |
| 4,821,797 | 4/1989 | Allgäuer et al. . | |
| 4,836,275 | 6/1989 | Sabaya et al. | 165/46 |
| 4,880,051 | 11/1989 | Ohashi | 165/45 |
| 4,911,229 | 3/1990 | McElroy | 165/45 |
| 5,045,541 | 10/1991 | Tripp | 165/45 |
| 5,069,199 | 12/1991 | Messner . | |
| 5,081,848 | 1/1992 | Rawlings et al. | 62/260 |
| 5,103,899 | 4/1992 | Kalina | 165/104.13 |
| 5,224,357 | 7/1993 | Galiyano et al. | 62/260 |

FOREIGN PATENT DOCUMENTS

| | | | |
|---|---|---|---|
| 3015149 | 10/1981 | Fed. Rep. of Germany | 165/45 |
| 3015172 | 10/1981 | Fed. Rep. of Germany | 165/45 |
| 3033255 | 3/1982 | Fed. Rep. of Germany | 165/45 |

*Primary Examiner*—Albert W. Davis, Jr.
*Attorney, Agent, or Firm*—Dunlap, Codding & Lee

[57] ABSTRACT

An improved ground source heat pump system wherein the subterranean piping installation is constructed of a plurality of modular heat exchange units. Each such unit comprises an external tube with an expanded external surface and an insulated internal tube positioned concentrically within the external tube. The units are integrally formed of flexible plastic material, except for the insulation. The expanded external surface of the external tube significantly increases the heat exchange capacity of the subterranean heat exchanger. The insulation around the internal tube prevents thermal interference between the internal and external tubes and further enhances the heat exchange capacity of the system. There is no need for spacers or fins in the space between the internal and external tubes to control annular spacing or to promote turbulence. Because of the increased efficiency of the system of this invention, less piping is required, which in turn reduces the cost of labor and materials to install such a system and the area of land mass required to contain it. Moreover, because the heat exchange conduit assemblies are modular, they can be prefabricated at a remote site and then conveniently transported to a construction site and installed much more quickly than the extended lengths of conventional piping.

10 Claims, 3 Drawing Sheets

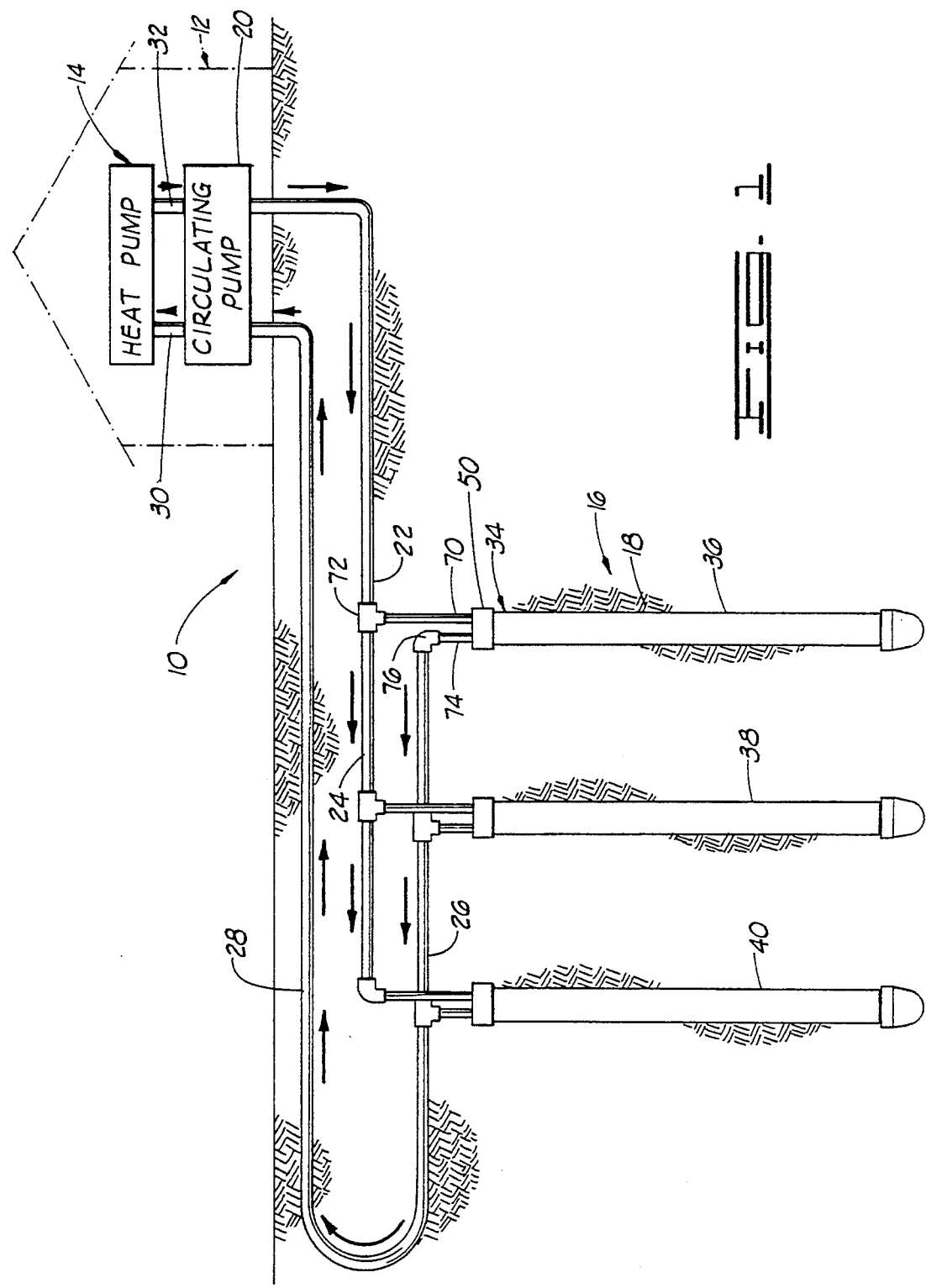

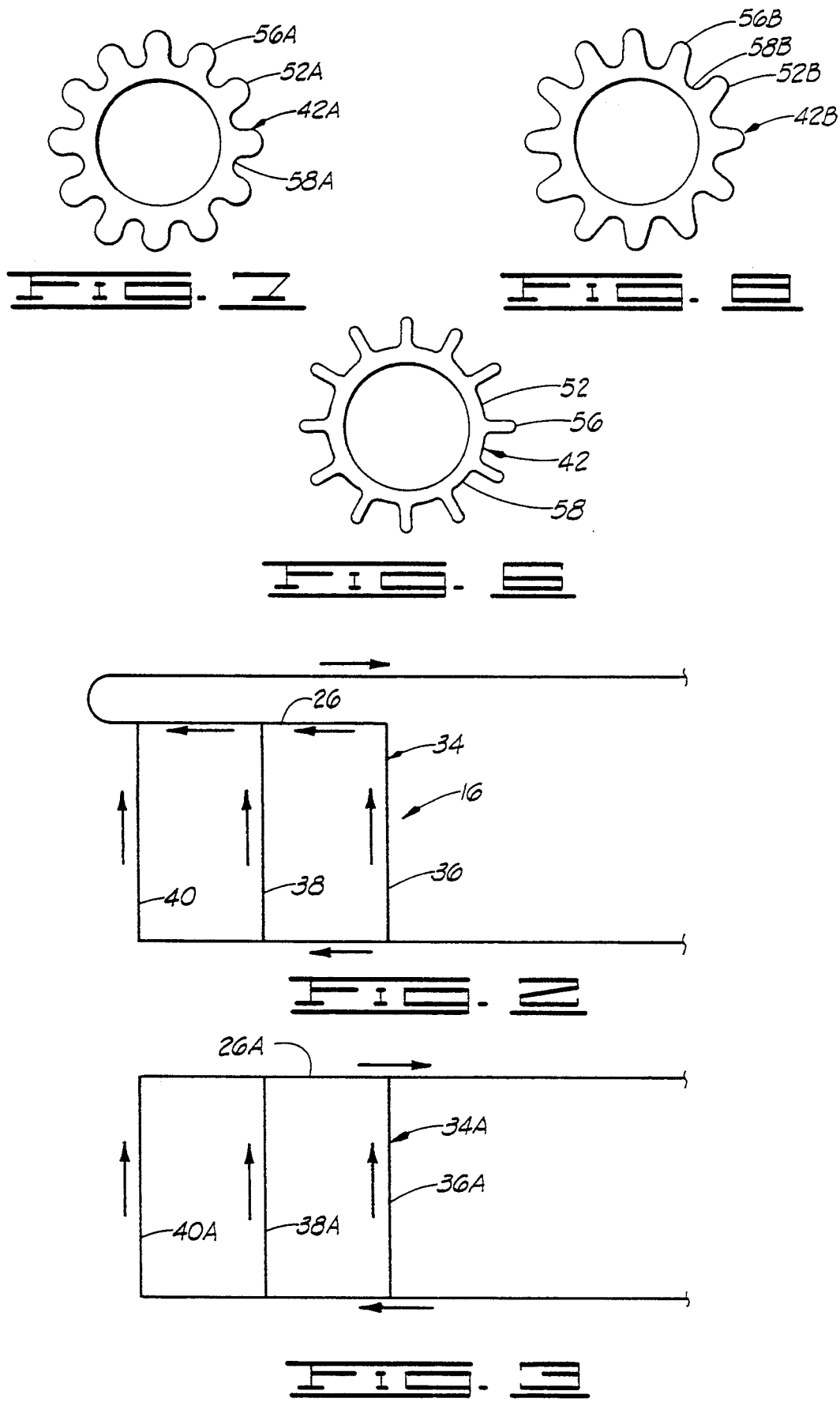

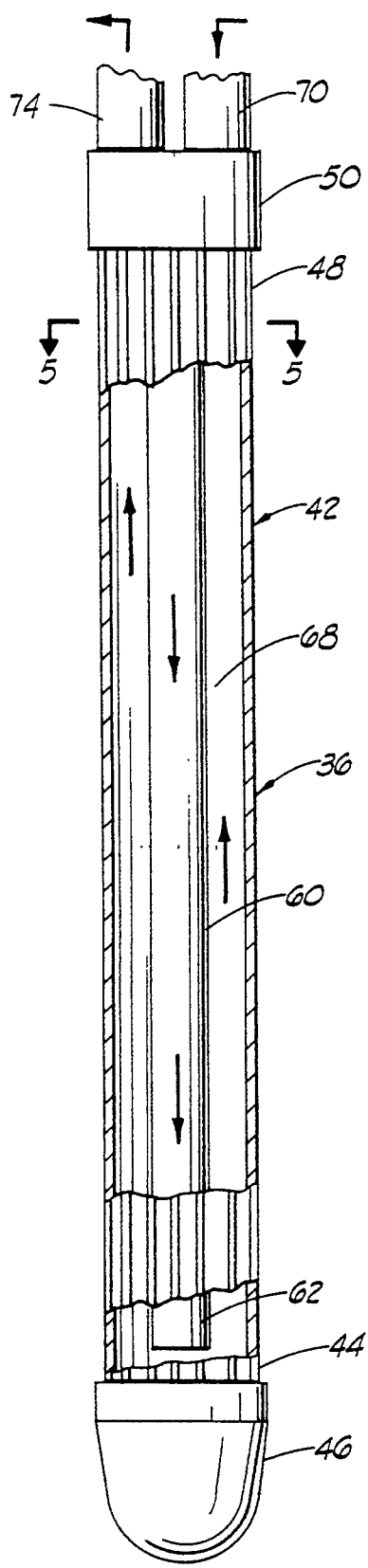
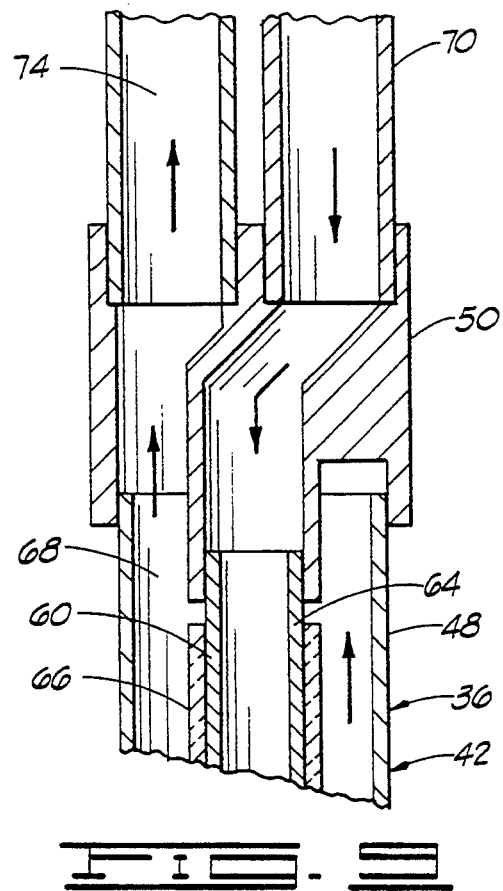
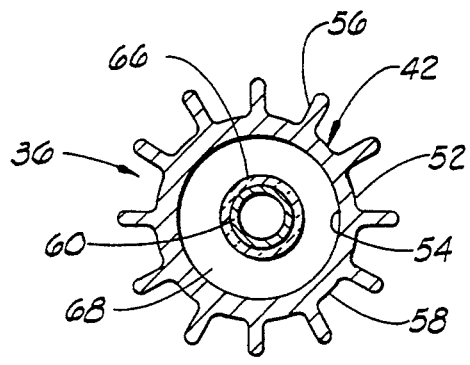

GROUND SOURCE HEAT PUMP SYSTEM COMPRISING MODULAR SUBTERRANEAN HEAT EXCHANGE UNITS WITH CONCENTRIC CONDUITS

This application is a continuation in part of co-pending application Ser. No. 08/014,988, filed Feb. 8, 1993, entitled GROUND SOURCE HEAT PUMP SYSTEM COMPRISING AN ARRAY OF MODULAR CONCENTRIC HEAT EXCHANGE CONDUITS, the entire contents of which are incorporated herein by reference.

FIELD OF THE INVENTION

The present invention relates to ground source heat pump systems.

SUMMARY OF THE INVENTION

The present invention is directed to an improvement in ground source heat pump systems and, in particular, to an improvement in the subterranean piping installation for a ground source heat pump system. The system of the present invention comprises a ground source heat pump assembly in the structure. The heat pump assembly serves to adjust the temperature of a fluid in the structure.

The system further comprises a subterranean heat exchanger and a conduit system for circulating a heat transfer fluid between the heat pump assembly in the structure and the subterranean heat exchanger. A pump is included for pumping the heat transfer fluid through the conduit system.

The subterranean heat exchanger of the system of this invention includes a supply and return header and a plurality of modular heat exchange units connected in parallel arrangement between the supply and return headers. Each heat exchange unit comprises an external tube having an expanded external surface and an upper end and a lower end. An insulated internal tube is disposed concentrically within the external tube. The internal tube has an upper end and a lower end and a length about the same as the length of the external tube. An end cap is included for sealing the lower end of the external tube. A manifold seals the upper end of the external tube and supports the internal tube within the external tube. The manifold also serves to connect the internal tube to the supply header of the subterranean heat exchanger and to connect the external tube to the return header of the subterranean heat exchanger. The heat exchange unit is integrally formed of flexible plastic material.

The present invention also includes a modular heat exchange unit adapted for connection between the supply and return headers of a subterranean heat exchanger in a ground source heat pump system. The modular heat exchange unit comprises an external tube, an insulated internal tube, an end cap, and a manifold, as in the ground source heat pump system summarized above.

BRIEF DESCRIPTION OF THE DRAWINGS

FIG. 1 is a schematic illustration of a ground source heat pump system constructed in accordance with the present invention.

FIG. 2 is a schematic diagram of a subterranean heat exchanger assembly designed for reverse return of the heat transfer fluid as shown in the embodiment of FIG. 1.

FIG. 3 is a schematic view of a subterranean heat exchanger assembly designed for direct return of the heat transfer fluid in accordance with another embodiment of the present invention.

FIG. 4 is a longitudinal, partially sectional view of a modular heat exchange unit of the system shown in FIG. 1.

FIG. 5 is a cross-sectional view of the heat exchange unit taken along line 5—5 in FIG. 2.

FIG. 6 is a cross-sectional view of a specific configuration of expanded surface pipe suitable for use as the external tube of the heat exchange unit of the present invention.

FIG. 7 is a cross-sectional view of a second configuration of expanded surface pipe suitable for use as the external tube of the heat exchange unit of the present invention.

FIG. 8 is a cross-sectional view of a third configuration of expanded surface pipe suitable for use as the external tube of the heat exchange unit of the present invention.

FIG. 9 is an enlarged sectional view of the manifold of the heat exchange unit shown in FIG. 2.

DETAILED DESCRIPTION OF THE PREFERRED EMBODIMENTS

With the decreasing availability of fossil fuels and the rising cost of fuels and electrical power, the need for efficiency in the operation of air conditioning and water heating systems becomes increasingly important. Because they reduce the need for heating or cooling created by external energy, ground source heat pumps are becoming a preferred type of air conditioning system and are also proving efficacious for water heating systems.

A ground source heat pump typically is employed to heat or cool the room air in a structure or to heat water for use in the structure. As used herein, the term "fluid" refers to air or water, or to any fluid in the structure, to be heated and/or cooled. The heat pump assembly in the structure transfers heat between the fluid in the structure and an underground piping installation. This is accomplished by circulating a heat transfer fluid through a conduit system which connects the heat pump in the structure with a subterranean heat exchanger. The subterranean heat exchanger dumps or sinks heat into, or recovers heat from, the surrounding earth or water in which the heat exchanger is installed.

Ground source or "earth coupled" heat pumps can provide a supply of heat and a reservoir for dumping heat on a year round basis and require substantially less energy for operation. This reduces the cost to the consumer and contributes to energy conservation in general. In extreme climates, a ground source heat pump can be augmented by a fossil fuel or an electric heater, if needed. Normally, an efficient ground source heat pump entirely supplants conventional electrical and fossil fuel units. Nevertheless, ground source heat pump systems have disadvantages.

In particular, the piping installations of conventional ground source systems require extensive lengths of pipe to achieve an adequate heat exchange capacity, especially for larger commercial or industrial facilities. The extreme pipe lengths require highly detailed designing to insure proper turbulent flow patterns, flow rate and heat exchange. Further, the extensive lengths of pipe required are costly and installation is labor intensive.

Finally, a large land mass is necessary to accommodate the lengthy piping installation.

The present invention is directed to an improvement in ground source heat pump systems utilizing a plurality of modular heat exchange units in the subterranean piping installation. Each heat exchange unit includes an external tube with an expanded external surface and an internal tube with an insulated external surface. With the heat exchange units thus constructed, the heat exchange capacity of the system per unit length of heat exchange conduit increases the heat exchange capacity of the system.

The heat exchange units preferably are prefabricated modular units. Thus, installation is simplified because the modular units do not require on-site construction. In addition, the total land mass required to contain the modular conduits is less than that required for conventional underground piping installations comprising extended lengths of individual pipes.

With reference now to the drawings in general and to FIG. 1 in particular, there is shown therein a ground source heat pump system in accordance with the present invention, designated generally by the reference numeral 10. The system 10 is associated with a structure 12 (shown in broken lines). The structure 12 may be a single or multi-family dwelling, commercial building, or any other structure in which there is a need to adjust the temperature of a selected fluid, such as air or water.

The system 10 comprises a ground source heat pump assembly 14 in the structure for adjusting the temperature of a selected fluid to be used in or about the structure. The heat pump assembly 14 is of conventional design and, thus, is not described or shown herein in detail. The heat pump assembly 14 typically includes a heat exchanger such as an evaporatorcondenser unit (not shown). Heat is transferred between the refrigerant in a refrigerant circuit in the evaporatorcondenser and the fluid medium which heats or cools the air or water in the structure.

In a water-to-air air conditioning system, a blower (not shown) is included in the assembly 14 for distributing the temperature-conditioned air throughout the interior of the structure 12. In a water-to-water air conditioning system, a suitable fluid distribution system (not shown) is included instead of the blower.

With continuing reference to FIG. 1, the system 10 further comprises an underground or subterranean heat exchanger assembly 16 comprising an array of heat exchange units installed in the earth 18 or in a pond or lake. The heat exchanger assembly 16 may be arranged vertically in boreholes or horizontally in trenches or supported in a suitable manner in the body of water. While the configuration and construction of the heat exchanger assembly 16 may vary, the assembly generally is adapted for permitting the transfer of heat between the heat transfer fluid and the surrounding earth 18 (or water).

Thus, in the cooling mode, heat in the heat transfer fluid is transferred into the cooler earth or water surrounding the heat exchanger assembly 16. Likewise, in the heating mode, warmth from the surrounding earth or water is absorbed by the heat transfer fluid. The heat transfer fluid may be water or a water and antifreeze solution.

A pumping unit 20 is provided for circulating the heat transfer fluid between the heat pump assembly 14 and the underground heat exchanger assembly 16. A supply line 22 carries the fluid from the pump 20 through a supply header 24 to the heat exchanger assembly 16. The fluid is returned to the pump 20 through a return header 26 and a return line 28. Heat transfer fluid is circulated between the circulating pump 20 and the heat pump assembly 14 by means of supply and return conduits 30 and 32, respectively. The return and supply headers 24 and 26 and much of the return and supply lines 22 and 28 preferably are buried several feet underground in trenches.

Referring still to FIG. 1, the subterranean heat exchanger assembly 16 comprises a plurality of heat exchange units, designated collectively by the reference numeral 34. It will be understood that the number and configuration of the units 34 may vary widely. For illustration purposes only, the heat exchange units 34 are depicted in FIG. 1 as including a first heat exchange unit 36, a second heat exchange unit 38 and a third heat exchange unit 40 arranged in parallel fashion.

Referring now to FIG. 2, the parallel heat exchange units 34 may be arranged in reverse return fashion. In this configuration, also depicted in FIG. 1, the units 34 are arranged so that the first unit 36 connects to the return header 26 upstream of the second unit 38, and the third unit 40 connects to the return header 34 downstream of the second unit 38.

Alternately, the parallel heat exchange units 34A may be configured in direct return fashion, as depicted in the diagram of FIG. 3. In this arrangement, the first unit 36A connects to the return header 26A downstream of the second unit 38A, and the third unit 40A connects to the return header 26A upstream of the second unit 38A.

In accordance with the present invention, the supply and return lines 22 and 28, the supply and return headers 24 and 26 and the heat exchange units 34 are constructed of flexible plastic material. A preferred material is high density polybutylene or polyethylene pipe, which is inert, noncorrosive and very flexible.

The flexibility of the plastic material of which the components of the heat exchange units are made is an important feature of this invention and provides several advantages. For example, as described herein the modular heat exchange units may be several hundred feet in length, and the flexibility of the material allows these units to be shipped and stored in rolls. Still further, the flexibility simplifies installation of these long units in that the extended lengths of piping can be unrolled and easily manipulated as the tubing is fed into the borehole.

With reference now to FIG. 4, the preferred heat exchange unit wi 11 be described. As the units 36, 38 and 40 are similarly formed, only the first heat exchange unit 36 will be described in detail. The unit 36 comprises an external tube 42. The bottom 44 of the external tube 42 is sealed by an end cap 46. The top 48 of the external tube 42 is sealed by a manifold 50.

As best seen in FIG. 5, the external tube 42 is characterized by an expanded external surface 52. As used herein, "expanded external (or internal) surface" means a surface which is deformed from a perfect round in cross-section to create a pattern of projections or fins whereby there is provided a greater area of interface between the surface of the piping and its environment relative to the interface provided by a pipe having a non-expanded surface, that is, a surface which is perfectly round in cross-section.

Because extrusion is the most economical process for producing piping, an expanded surface on which the fins run longitudinally (forming longitudinal channels there-between) is the preferred configuration. However, it will be appreciated that other patterns, such as concentric fins or continuous spiral fin, would also serve to provide additional surface area for the heat exchange interface.

With continued reference to FIG. 5, the internal surface 54 of the external tube 42 preferably is perfectly round in cross-section. However, an expanded internal surface may be employed, so long as the volume capacity of the external tube 42 is considered relative to the other parameters of the system so that proper flow rates and flow patterns are maintained.

The specific patterns of the expanded external surface of the external tube vary. For example, as illustrated in FIG. 6 and also in FIG. 5, previously described, the external surface 52 of the external tube 42 defines a plurality of longitudinal fins 56 which in cross-section have a substantially uniform width from the base to the end. The fins 56 define longitudinal channels 58 therebetween, and the width of the channels 58 is substantially greater than the width of the fins 56.

Turning to FIG. 7, there is shown therein another suitable configuration for the expanded external surface of an external tube 42A. In this embodiment, the surface 52A defines fins 56A which in cross-section have rounded ends and which have the same width from the base to the end. The width of the intervening channels 58A is approximately equal to the width of the ends of the fins 56A.

With reference now to FIG. 8, yet another configuration for the expanded surface for an external tube 42B is depicted. In this embodiment, the surface 52B has fins 56B and intervening channels 58B of approximately the same width. The fins 56B narrow slightly from the base to the end.

Returning to FIGS. 4 and 5, the heat exchange unit 36 includes an internal tube 60 which has an open lower end 62. The upper end 64 of the internal tube 60 is supported from the manifold 50 as shown in FIG. 9.

Surrounding the internal tube 60 is a layer of closed cell, waterproof insulating material. The insulation layer 66 prevents or retards thermal interference between the heat transfer fluid traveling down the internal tube 60 and the heat transfer fluid traveling up the lumen 68 of the external tube 42. Still further, there is no need for spacers or fins to control annular spacing between the internal tube 60 and the external tube 42 or to create turbulence because positioning of the internal tube 60 in relation to the external tube 60 is unimportant, and fluid flow patterns are controlled by other factors including diameter, lumen and flow rate.

Referring still to FIG. 4 and also to FIG. 1, the manifold 50 provides a connection with a first connecting pipe 70 which in turn is connected to the supply header 24 by a fitting 72 of some sort. (See FIG. 1.) The manifold 50 also provides a connection with a second connecting pipe 74 which is in turn connected by a fitting 76 to the return header 26.

In the preferred practice of this invention, each heat exchange unit comprising the underground heat exchanger assembly is integrally formed. To this end, the manifolds and end caps are heat fused to the conduits. This produces, in effect, a solid unitary structure.

The installation of the underground heat exchanger assembly and accompanying return and supply headers and return and supply lines, are installed in the earth or in ground water. In a preferred earth installation method, a vertical borehole is drilled into the earth for each modular heat exchange unit. Then the unit is dropped into the borehole and connected to the return and supply headers. The borehole typically is "back filled" with a heat conductive filler, such as soil, bentonite or water, for example. Now it will be understood that one advantageous feature of the modular heat exchange unit of this invention is that back filling of the borehole is easily accomplished.

The lengths and internal diameters of the internal tubes and the external tubes are selected to produce a desired flow pattern and flow rates whereby heat exchange efficiency is maximized. This further enhances the total heat exchange efficiency of the system 10. In most instances, all the heat exchange units in a particular system will be the same length and will be similarly formed.

Although dimensions will vary depending on the particular installation, the return and supply headers 24 and 26 typically will be at least 10 feet in length and will have an internal diameter of at least 1.25 to 2.00 inches. The dimensions of the return and supply lines will depend primarily on the location of the underground installation relative to the structure it will serve.

Most underground heat exchanger assemblies 16 will comprise 2 to 10 modular heat exchange units. The dimensions of the internal and external tubes will vary. As described, the underground heat exchange units may be manufactured in a variety of standard sizes. For example, one preferred standard unit will comprise units which are about 50 feet or more in length, where the internal diameter of the external tube is at least 1.50 to 4.00 inches and the external diameter of the external tube is about 1.88 to 5.00 inches. The internal diameter of the internal tube 60 may be about 0.85 to 1.06 inches, and the external diameter of the internal tube 60, including the layer of insulation 61, is in the range of about 1.50 to about 1.75 inches or greater. Other standard unit sizes may include, for example, units which have lengths of 75, 100, 200 and 400 feet.

Now it will be understood that, once standard sizes and configurations for underground units are selected, the heat exchange capacity of each size unit can be calculated and provided to the system designer. The designer then, based on these given figures, can simply select a suitable size and number of units. These can be delivered to the construction site and attached without further assembly to the headers.

It will be appreciated that the expanded external surface 52 of the external tube 42 pipe presents substantially more surface to the surrounding earth 18. As a result, the heat transfer capability of the underground heat exchanger assembly 16 is enhanced. The concentric arrangement of the internal tube 60 and the external tube 42 consolidates the piping required to effect heat transfer, thus reducing the overall length of piping required. Thus, the overall cost of constructing and installing a ground source heat pump system is reduced, and less land area is necessary to contain the underground piping assembly.

Changes may be made in the combination and arrangement of the various parts, elements, steps and procedures described herein without departing from the spirit and scope of the invention as defined in the following claims.

What is claimed is:

1. A ground source heat pump system for a structure, the system comprising:

a ground source heat pump assembly in the structure for adjusting the temperature of a fluid in the structure;

a subterranean heat exchanger;

a conduit system for circulating a heat transfer fluid between the ground source heat pump assembly in the structure and the subterranean heat exchanger;

a pump adapted to pump heat transfer fluid through the conduit system; and wherein the subterranean heat exchanger comprises a supply and return header and a plurality of modular heat exchange units connected in parallel arrangement between the supply and return headers; and wherein each of the modular heat exchange units comprises:

an external tube having an expanded external surface and having an upper end and a lower end;

an internal tube disposed concentrically within the external tube, such internal tube having an upper end and a lower end and having a length about the same as the length of the external tube;

a layer of insulation around the internal tube; an end cap for sealing the lower end of the external tube;

a manifold for sealing the upper end of the external tube and for supporting the internal tube within the external tube, the manifold adapted to connect the internal tube to the supply header of the subterranean heat exchanger and to connect the external tube to the return header of the subterranean heat exchanger; and wherein the internal tube, the external tube, the end cap and the manifold are integrally formed of flexible plastic material.

2. The ground source heat pump system of claim 1 wherein the expanded external surface of the external tube of each heat exchange unit in the subterranean heat exchanger defines a plurality of longitudinal fins extending the length of the tube.

3. The ground source heat pump system of claim 1 wherein the external tube of the heat exchange unit in the subterranean heat exchanger is characterized by an internal surface which is circular in cross-section.

4. The ground source heat pump system of claim 1 wherein the parallel heat exchange units are arranged in reverse return fashion.

5. The ground source heat pump system of claim 1 wherein the parallel heat exchange units are arranged in direct return fashion.

6. The ground source heat pump system of claim 1 wherein the internal tube of each heat exchange unit is characterized by an internal and external surface which is circular in cross-section.

7. A modular heat exchange unit adapted for connection between the supply and return headers of a subterranean heat exchanger assembly in a ground source heat pump system comprising:

an external tube having an expanded external surface and having an upper end and a lower end;

an internal tube disposed concentrically within the external tube, such internal tube having an upper end and a lower end and having a length about the same as the length of the external tube;

a layer of insulation around the internal tube;

an end cap for sealing the lower end of the external tube;

a manifold for sealing the upper end of the external tube and for supporting the internal tube within the external tube, the manifold being adapted to connect the internal tube to the supply header of the subterranean heat exchanger and to connect the external tube to the return header of the subterranean heat exchanger; and wherein the internal tube, the external tube, the end cap and the manifold are integrally formed of flexible plastic material.

8. The modular heat exchange unit of claim 7 wherein the expanded external surface of the external tube defines a plurality of longitudinal fins extending the length of the tube.

9. The modular heat exchange unit of claim 7 wherein the internal surface of the external tube of the heat exchange unit is circular in cross-section.

10. The modular heat exchange unit of claim 7 wherein the internal tube is characterized by an internal and external surface which is circular in cross-section.

* * * * *

UNITED STATES PATENT AND TRADEMARK OFFICE
CERTIFICATE OF CORRECTION

PATENT NO. : 5,339,890

DATED : August 23, 1994

INVENTOR(S) : Rawlings

It is certified that error appears in the above-identified patent and that said Letters Patent is hereby corrected as shown below:

Column 2, line 9, "FIG 2" should be -- FIG 4 --.

Column 2, line 23, "FIG 2" should be -- FIG 4 --.

Column 2, line 28, "with" should be -- With --.

Column 3, line 35, "evaporatorcondensor" should be -- evaporator\condensor --.

Column 3, line 37, "evaporatorcondensor" should be -- evaporator\condensor --.

Column 4, line 24, "return header 34" should be -- return header 26 --.

Column 4, line 49, "wi ll" should be -- will --.

Column 5, line 48, "external tube 60" should be -- external tube 42 --.

Column 6, line 36 "insulation 61" should be -- insulation 66 --.

UNITED STATES PATENT AND TRADEMARK OFFICE
CERTIFICATE OF CORRECTION

PATENT NO. : 5,339,890

DATED : August 23, 1994

INVENTOR(S) : Rawlings

It is certified that error appears in the above-indentified patent and that said Letters Patent is hereby corrected as shown below:

Column 7, line 22, "an" at the end of the line should begin the first line of a new clause.

Signed and Sealed this

Tenth Day of January, 1995

Attest:

BRUCE LEHMAN

Attesting Officer

Commissioner of Patents and Trademarks